United States Patent [19]
McGusty et al.

[11] 3,718,679
[45] Feb. 27, 1973

[54] PHOSPHINE OR PHOSPHITE GOLD COMPLEXES OF THIOMALIC ACID

[75] Inventors: Elizabeth R. McGusty, Philadelphia; Blaine M. Sutton, Hatboro, both of Pa.

[73] Assignee: Smith Kline & French Laboratories, Philadelphia, Pa.

[22] Filed: April 27, 1971

[21] Appl. No.: 137,961

[52] U.S. Cl..................................260/430, 424/215
[51] Int. Cl.................................................C07f 1/12
[58] Field of Search......................................260/430

[56] References Cited

UNITED STATES PATENTS

| | | | |
|---|---|---|---|
| 1,994,213 | 3/1935 | Delepine | 260/430 |
| 2,352,124 | 6/1944 | Sabin et al. | 260/430 X |
| 2,370,592 | 2/1945 | Trenner et al. | 260/430 |
| 2,451,841 | 10/1948 | Lewenstein | 260/430 |
| 2,509,200 | 5/1950 | Moore et al. | 260/430 |
| 2,607,789 | 8/1952 | Weiss | 260/430 |
| 2,660,549 | 11/1953 | Friedheim | 260/430 X |

OTHER PUBLICATIONS

Kowala et al., Aust. J. Chem. Vol. 19, pp. 547–554 (1966).
Mann et al., J. Chem. Soc. pp. 1235–1239 (1940).
J. Chem. Soc. p. 1828 (1937).

*Primary Examiner*—H. Sneed
*Attorney*—William H. Edgerton, Richard D. Foggio, Joan S. Keps, Alan D. Lourie and Joseph A. Marlino

[57] ABSTRACT

Phosphine or phosphite gold complexes of thiomalic acid having anti-arthritic activity are prepared by reaction of an appropriate phosphine or phosphite gold halide with thiomalic acid.

4 Claims, No Drawings

PHOSPHINE OR PHOSPHITE GOLD COMPLEXES OF THIOMALIC ACID

This invention relates to novel phosphine or phosphite gold complexes of thiomalic acid having useful pharmacodynamic activity. More specifically the compounds of this invention have anti-arthritic activity as measured by their ability to inhibit adjuvant-induced polyarthritis in rats. Thus the compounds of this invention decrease the inflamed hind leg volumes in experimental rats when compared to controls at oral doses as low as 10 mg/kg/day, calculated on gold content. Of particular importance is the attainment of significant serum levels of gold following oral administration of these doses.

Gold salts such as gold sodium thiomalate are known to have anti-arthritic activity but their utility is limited by the requirement that they be administered by the parenteral route. Thus the compounds of this invention have the distinct advantage of being active upon oral administration.

The compounds of this invention are represented by the following structural formula:

Formula I

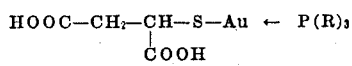

$$HOOC-CH_2-CH-S-Au \leftarrow P(R)_3$$
$$\phantom{HOOC-CH_2-CH}|$$
$$\phantom{HOOC-CH_2-CH}COOH$$

wherein R represents lower alkyl, phenyl, lower alkoxy or phenoxy, with the lower alkyl and lower alkoxy moieties being straight or branched chain, of from one to three carbon atoms.

The compounds of formula I above are prepared by the reaction of thiomalic acid, preferably in an aqueous solution of an alkali metal hydroxide such as sodium hydroxide, with a phosphine or phosphite gold halide, preferably chloride, in a nonreactive organic solvent such as ethanol at a temperature from −10° to 0°C. for from 30 to 90 minutes. Acidification of the reaction mixture liberates the free acid product which is then purified by chromatography. Alternatively, the compounds of formula I may be isolated as carboxylate salts of an alkali metal, preferably disodium, or converted to such salts by treatment with the appropriate alkali metal hydroxide and similarly have anti-arthritic activity.

The phosphine or phosphite gold halides employed as described above are prepared as follows. For example, a solution of thiodiglycol in a nonreactive organic solvent is mixed with an aqueous solution of gold acid chloride trihydrate, cooled to a temperature of from −10° to −5°C. and then the solution is reacted with an appropriate phosphine or phosphite to give the corresponding phosphine or phosphite gold chlorides. Reference also may be made to *J. Chem. Soc.*, 1828 (1937) and 1235 (1940); *Australian J. Chem.*, 19, 547 (1966).

The compounds of this invention are administered in conventional dosage unit forms by incorporating an amount sufficient to produce anti-arthritic activity with a nontoxic pharmaceutical carrier according to accepted procedures. Preferably the dosage units will contain a phosphine or phosphite gold complex of formula I or an alkali metal salt thereof in an amount of from about 1 mg. to about 25 mg., preferably 1 mg. to 10 mg. calculated on gold content, per unit.

The pharmaceutical carrier employed may be, for example, either a solid or liquid. Exemplary of solid carriers are lactose, terra alba, sucrose, talc, gelatin, agar, pectin, acacia, magnesium stearate, steric acid and the like. Exemplary of liquid carriers are syrup, peanut oil, olive oil, water and the like. Similarly the carrier or diluent include any time delay material well known to the art, such as glyceryl monostearate or glyceryl distearate alone or with a wax.

A wide variety of pharmaceutical forms can be employed. Thus, if a solid carrier is used the preparation can be tableted, placed in a hard gelatin capsule in powder or pellet form or in the form of a troche or lozenge. The amount of solid carrier will vary widely but preferably will be from about 25 mg. to about 1 g. If a liquid carrier is used, the preparation will be in the form of a syrup, emulsion, soft gelatin capsule, sterile injectable liquid such as an ampule or an aqueous or nonaqueous liquid suspension.

The pharmaceutical dosage unit forms described hereinabove exclude simple non-sterile solutions of the active medicament in water or in common organic solvents and exclude simple aqueous suspensions of the active medicament in the absence of a suspending agent.

The method of producing anti-arthritic activity in accordance with this invention comprises administering internally to an animal organism a phosphine or phosphite gold complex of formula I above, usually combined with a pharmaceutical carrier, in an amount sufficient to produce antiarthritic activity without limiting side effects. The active medicament will be administered in a dosage unit, as described above, orally or parenterally, the oral route being preferred. Advantageously equal doses will be administered one or two times daily with the daily dosage regimen being from about 1 mg. to about 50 mg., preferably 1 mg. to about 20 mg., calculated on gold content. When the method described above is carried out anti-arthritic activity is produced with a minimum of side effects.

The pharmaceutical preparations are made following the conventional techniques of the pharmaceutical chemist involving mixing, granulating and compressing when necessary, or variously mixing and dissolving the ingredients as appropriate to the desired end product.

The following examples illustrate the preparation of compounds of this invention and their incorporation into pharmaceutical compositions, and as such are not to be considered as limiting the invention set forth in the claims appended hereto.

PREPARATIONS

Triethylphosphinegold chloride

A solution of 10.0 g. (0.08 mole) of thiodiglycol in 25 ml. of ethanol is mixed with a solution of 15.76 g. (0.04 mole) of gold acid chloride trihydrate in 75 ml. of distilled water. When the bright orange-yellow solutions is almost colorless, it is cooled to below −5° C. and an equally cold solution of 5.0 g. (0.0425 mole) of triethylphosphine in 25 ml. of ethanol is added dropwise to the stirred solution. After the addition is complete, the cooled mixture is stirred for one-half hour. Solid that separates is removed and the filtrate is concentrated to about 30 ml. to yield a second crop. The combined solid is washed with aqueous-ethanol (2:1) and recrystallized from ethanol by adding water to the cloud point. The product is obtained as white needles, m.p. 85°-86°C.

Triisopropylphosphinegold chloride

A mixture of 11.82 g. (0.03 mole) of gold acid chloride trihydrate and 7.9 g. (0.065 mole) of thiodiglycol in 100 ml. of aqueous ethanol (3:2) is stirred until the color of auric gold disappears. The almost colorless solution is cooled below −5° C. and an equally cold solution of 5.6 g. (0.035 mole) of triisopropylphosphine in 20 ml. of ethanol is added dropwise. The volume of the final reaction mixture is increased to 250 ml. with aqueous ethanol (1:1) in order to maintain a fluid mixture. After the addition is complete, the mixture is stirred in the cold for 45 minutes. The solid is removed by filtration, washed first with alcohol-water (1-2) then with water and dried. It is redissolved by suspending in ethanol and adding sufficient methylene chloride for solution. The cloudy solution is filtered from suspended gold and the filtrate concentrated until crystallization. There is obtained white crystals, m.p. 184°-6°C.

Trimethylphosphinegold chloride

A solution of 2.44 g. (0.02 mole) of thiodiglycol in 15 ml. of methanol is mixed with a solution of 3.98 g. (0.01 mole) of gold acid chloride trihydrate in 25 ml. distilled water. When the orange-yellow solution becomes almost colorless, it is cooled to −15°C. and an equally cold solution of 760 mg. (0.01 mole) of trimethylphosphine in 10 ml. of methanol is added dropwise to the stirred solution. After the addition, the cooled mixture is stirred for one-half hour. The product is filtered off and the filtrate concentrated under reduced pressure to yield a second crop. The combined product is washed with cold aqueous methanol (2:1) and water, m.p. 228°-229°C.

By following procedures outlined in *J. Chem. Soc.* 1828 (1937) trialkylphosphinegold iodide complexes are prepared, for example triethylphosphinegold iodide. Similarly, by following procedures outlined in *J. Chem. Soc.*, 1235 (1940) trialkylphosphinegold bromides are prepared, for example triethylphosphinegold bromide and trimethylphosphinegold bromide.

Trimethylphosphitegold chloride

Gold acid chloride trihydrate (4.0 g.) is reduced to aurous chloride with 2.44 g. of thiodiglycol in aqueous-methanol (1:2) solution. The resulting solution is cooled to below −5°C. and an equally cold solution of 1.5 g. of trimethylphosphite in 10 ml. of methanol is added dropwise, with stirring under nitrogen. The reaction mixture is stirred for 30 minutes, filtered and the solid is washed with cold aqueous methanol and dried. The product is dissolved in 5 ml. of chloroform, diluted with 10 ml. of methanol and filtered through charcoal. The filtrate is concentrated under reduced pressure, cooled and diluted with ice-water to precipitate the product, m.p. 99°-100°C.

Triethylphosphitegold chloride

Gold acid chloride trihydrate (5.9 g., 0.015 m.) is reduced to aurous chloride with thiodiglycol 9(3.7 g., 0.03 m.) in aqueous ethanol (1:2) solution. The solution is cooled to −10°C. and an equally cold solution of 3.72 g. (0.02 m.) of triethylphosphite in 20 ml. of ethanol is added, dropwise with stirring. The temperature is maintained at −10°C. and stirring is continued for 30 minutes. The ethanol is removed from the reaction mixture under reduced pressure without heating. The aqueous residue is extracted with methylene chloride and the dried extract is evaporated under reduced pressure. The crude product is purified by chromatography over a silica column to give an oil.

Triphenylphosphinegold chloride

Gold acid chloride trihydrate (4.0 g., 0.01 m.) is reduced to aurous chloride with thiodiglycol in 1:2 aqueous ethanol. After cooling this solution in an ice-bath, a cold solution of 2.62 g. (0.01 m.) of triphenylphosphine in a minimum amount of ethanol is added with stirring. The reaction mixture is stirred for about 30 minutes, filtered and the product washed with cold aqueous alcohol, then ice-water and dried, m.p. 242°-243°C.

EXAMPLE 1

To a solution of thiomalic acid (1.5 g., 0.01 m.) in cold dilute aqueous sodium hydroxide (1.2 g. of sodium hydroxide in 30 ml. of water) is added, with stirring, 3.5 g. (0.01 m.) of triethylphosphinegold chloride in 30 ml. of ethanol. The temperature is maintained below 0°C. and stirring is continued for 30 minutes. To the resulting aqueous alcoholic solution, dilute formic acid is added to produce the free acid of the product. The solution is concentrated under reduced pressure at room temperature to remove the alcohol and the aqueous residue is extracted with ethyl acetate. The dried extract is concentrated to a small volume under reduced pressure and then chromatographed on a silica column to give S-triethylphosphinegold thiomalic acid, m.p. 134°-135°C.

Similarly, following the procedure described above, equimolar amounts of thiomalic acid and the phosphine or phosphites prepared in the Preparations above are reacted to give the corresponding phosphine gold complexes of thiomalic acid.

EXAMPLE 2

| Ingredients | Mg./Tablet |
|---|---|
| S-Triethylphosphinegold thiomalic acid | 5 |
| Calcium sulfate, dihydrate | 150 |
| Sucrose | 25 |
| Starch | 15 |
| Talc | 5 |
| Stearic acid | 3 |

The sucrose, calcium sulfate and S-triethylphosphinegold thiomalic acid are thoroughly mixed and granulated with hot 10 percent gelatin solution. The wetted mass is passed through a No. 6 mesh screen directly onto drying trays. The granules are dried at 120°F. and passed through a No. 20 mesh screen, mixed with the starch, talc and stearic acid, and compressed into tablets.

What is claimed is:

1. A chemical compound of the formula:

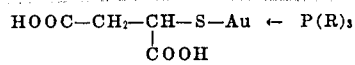

or its alkali metal salt, wherein R is lower alkyl, phenyl, lower alkoxy or phenoxy, said lower alkyl and lower alkoxy being straight or branched chain of from 1 to 3 carbon atoms.

2. A compound according to claim 1 in which R is lower alkyl.

3. A compound according to claim 2 in which R is ethyl.

4. A compound according to claim 3 in the form of its disodium salt.

* * * * *